United States Patent
Pan et al.

(10) Patent No.: US 10,938,052 B2
(45) Date of Patent: Mar. 2, 2021

(54) ALTERNATIVE ANODE MATERIAL FOR SOLID OXIDE FUEL CELLS

(71) Applicant: University of Maryland, College Park, College Park, MD (US)

(72) Inventors: Ke-Ji Pan, North Bethesda, MD (US); Eric D. Wachsman, Fulton, MD (US); Mohammed Hussain Abdul Jabbar, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 132 days.

(21) Appl. No.: 16/085,778

(22) PCT Filed: Mar. 17, 2017

(86) PCT No.: PCT/US2017/023063
§ 371 (c)(1),
(2) Date: Sep. 17, 2018

(87) PCT Pub. No.: WO2017/161332
PCT Pub. Date: Sep. 21, 2017

(65) Prior Publication Data
US 2019/0051920 A1    Feb. 14, 2019

Related U.S. Application Data

(60) Provisional application No. 62/310,371, filed on Mar. 18, 2016.

(51) Int. Cl.
*H01M 8/1213*     (2016.01)
*H01M 8/1253*     (2016.01)
(Continued)

(52) U.S. Cl.
CPC ....... *H01M 8/1213* (2013.01); *H01M 4/8605* (2013.01); *H01M 4/9033* (2013.01);
(Continued)

(58) Field of Classification Search
CPC ............ H01M 8/1213; H01M 4/8605; H01M 8/1253; H01M 4/9033; H01M 2008/1293; H01M 4/8621; Y02E 60/50; Y02P 70/50
(Continued)

(56) References Cited

U.S. PATENT DOCUMENTS

2006/0127747 A1    6/2006  Arico et al.
2012/0094218 A1    4/2012  Xiao et al.
(Continued)

OTHER PUBLICATIONS

Pan, K., et al., "High performance LT-SOFC based on a Strontium Iron Cobalt Molybdenum Oxide based ceramic anode support," AIChE Annual Meeting Nov. 14, 2016, Abstract 474724, American Institute of Chemical Engineers (2016).
(Continued)

*Primary Examiner* — Gary D Harris
(74) *Attorney, Agent, or Firm* — Morgan, Lewis & Bockius LLP (57) ABSTRACT

Anode materials comprising various compositions of strontium iron cobalt molybdenum oxide (SFCM) for low- or intermediate-temperature solid oxide fuel cell (SOFCs) are provided. These materials offer high conductivity achievable at intermediate and low temperatures and can be used to prepare the anode layer of a SOFC. A method of making a low- or intermediate temperature SOFC having an anode layer including SFCM is also provided.

20 Claims, 10 Drawing Sheets

(51) Int. Cl.
  *H01M 4/90* (2006.01)
  *H01M 4/86* (2006.01)
  *H01M 8/124* (2016.01)

(52) U.S. Cl.
  CPC .. *H01M 8/1253* (2013.01); *H01M 2008/1293* (2013.01); *Y02E 60/50* (2013.01); *Y02P 70/50* (2015.11)

(58) Field of Classification Search
  USPC .......................................................... 429/479
  See application file for complete search history.

(56) References Cited

U.S. PATENT DOCUMENTS

2012/0231366 A1   9/2012   Wachsman et al.
2016/0240878 A1*  8/2016   Hammad ............ H01M 8/0681

OTHER PUBLICATIONS

Song, Y., et al., "Effect of cobalt-substitution $Sr_2Fe_{1.5-x}Co_xMo_{0.5}O_{6-\delta}$ for intermediate temperature symmetrical solid oxide fuel cells fed with H2-H2S," *Electrochimica Acta* 139:13-20, Elsevier, Netherlands (2014) (Abstract Only).

International Search Report and Written Opinion for International Application No. PCT/US17/23063, International Searching Authority, United States, dated Aug. 1, 2017, 10 pages.

Song, Y., et al., "Effect of cobalt-substitution $Sr_2Fe_{1.5-x}Co_xMo_{0.5}O_{6-\delta}$ for intermediate temperature symmetrical solid oxide fuel cells fed with $H_2$-$H_2S$." *Electrochimica Acta,* 139:13-20, Elsevier Ltd., Netherlands (2014).

Zhou, Y., et al., "$SrFe_{0.75}Mo_{0.25}O_{3-\delta}$ impregnated 430L alloys for efficient fuel oxidation in metal supported solid oxide fuel cells," *Journal of Power Sources* 269:244-249, Elsevier B.V., Netherlands (2014).

\* cited by examiner

ALTERNATIVE ANODE MATERIAL FOR SOLID OXIDE FUEL CELLS

BACKGROUND OF THE INVENTION

Field of The Invention

This invention relates to solid oxide fuel cell (SOFC) anode materials that comprise various compositions of a strontium iron cobalt molybdenum oxide (SFCM). These materials offer high conductivity achievable at intermediate and low temperatures and can be used to prepare the anode layer of a SOFC. A method of making a low- or intermediate-temperature SOFC having an anode layer including SFCM is also provided.

Background

SOFCs are electrochemical energy conversion devices that can directly convert hydrogen or hydrocarbons into electrical power with high efficiencies. Conventionally, SOFCs operate a high temperatures (~800° C.), which limits the choice of materials for SOFC components. Furthermore, high temperature operation leads to rapid degradation of SOFC components. Lowering the operating temperature of SOFCs can overcome such issues; however, electrode resistance increases due to sluggish reaction kinetics, affecting the overall fuel cell efficiency.

Typically, the anode forms the principal structural component of SOFCs and therefore, it is critical that the anode material should be highly efficient. For traditional SOFC anode materials, porous Ni-YSZ or Ni-GDC composites are often fabricated to achieve both high ionic conductivity and high electronic conductivity. However, even though nickel is highly electronically conductive and catalytically active, there are problems with it, such as volume change during thermal and reduction-oxidation cycling, carbon deposition when using hydrocarbon fuels, and low sulfur tolerance. Considering these issues, electronically conductive ceramics offer a promising alternative to nickel-based anodes. And, ceramic oxide based anodes are also a potential replacement for conventional Ni-GDC anodes considering their tolerance toward coking and sulfur poisoning. But, the electronic conductivity and catalytic activity for hydrogen oxidation for ceramic anodes are much lower than with Ni-GDC anodes. Application of ceramic anodes for low temperature operating SOFCs is still being researched. And, ceramic anodes suffer from several fabrication challenges such as thermal mismatch, chemical stability and incompatibilities with other components (e.g., electrolyte). Furthermore, the conductivity of electronically conductive ceramics is much lower than nickel, which is deleterious to the performance of SOFCs.

Others have developed all-ceramic anode materials with acceptable conductivity for SOFCs. Such anode materials include niobium doped strontium titanate (SNT), which can have good electronic conductivity (~6.5 S-cm$^{-1}$) after reduction at ~930° C. and shows good reduction-oxidation stability. SNT and alternative conductive ceramics for SOFC anodes require conductivity activation by high temperature sintering of the material in a reducing environment or in situ reduction at high temperatures. However, neither of these options is feasible for intermediate or low-temperature SOFCs.

Thus, there is a need for an improved low temperature anode material for use within solid oxide fuel cells. There is a need for new electronically conductive ceramic materials that meet both the conductivity and stability requirements of the anode and are compatible with intermediate- and low-temperature operation.

SUMMARY OF THE INVENTION

Some embodiments include a solid-oxide fuel cell having a cathode layer; an electrolyte layer; and an anode layer. The anode layer including a strontium iron cobalt molybdenum oxide material.

In one embodiment, the disclosure provides a solid-oxide fuel cell comprising: a cathode layer; an electrolyte layer; and an anode layer, the anode layer comprising a strontium iron cobalt molybdenum (SFCM) oxide material.

In another embodiment, the disclosure provides a solid oxide fuel cell, wherein the anode layer is configured to allow electron percolation through the strontium iron cobalt molybdenum oxide material.

In another embodiment, the disclosure provides a solid oxide fuel cell, wherein the SFCM oxide material has the formula:

$$SrM^1{}_xM^2{}_{((1-x)/2)}Mo_{((1-x)/2)}O_{3\pm\delta}$$

wherein $M^1$ and $M^2$ are different transition metals and are not Mo, x is about 0.1-0.5; and δ is about 0-1.5. In one embodiment, $M^1$ is Fe and $M^2$ is Co.

In another embodiment, the disclosure provides a solid oxide fuel cell, wherein the SFCM oxide material has the formula:

$$SrM^1{}_xM^2{}_yMo_zO_3$$

wherein $M^1$ and $M^2$ are different transition metals and are not Mo, x is about 0.1-0.5; y is about 1−x; and z is about 1−x. In one embodiment, $M^1$ is Fe and $M^2$ is Co.

In another embodiment, the disclosure provides a solid oxide fuel cell, wherein x is about 0.1-0.4. In another embodiment, x is about 0.1-0.3. In another embodiment, x is about 0.1-0.25.

In another embodiment, the disclosure provides a solid oxide fuel cell, wherein the cathode layer comprises a composite comprising:

(a) a material selected from the group consisting of lanthanum strontium cobalt iron oxide (LSCF), barium strontium cobalt iron oxide (BSCF), samarium strontium cobalt iron oxide (SSCF), samarium strontium cobalt oxide (SSC), and lanthanum strontium manganate (LSM); and (b) a material selected from the group consisting of yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

In another embodiment, the disclosure provides a solid oxide fuel cell, wherein the cathode layer comprises a composite comprising SSC and GDC.

In another embodiment, the disclosure provides a solid oxide fuel cell, wherein the electrolyte layer comprises a material selected from the group consisting of YSZ, SSZ, GDC, SDC, SNDC, ESB, DWSB, YSB, and LSGM.

In another embodiment, the disclosure provides a solid oxide fuel cell, wherein the electrolyte layer comprises GDC.

In another embodiment, the disclosure provides a solid oxide fuel cell, wherein the anode layer has a conductivity of between 10 S/cm and 100 S/cm when measured at a temperature between 350° C. and 850° C.

In another embodiment, the disclosure provides a solid oxide fuel cell, wherein the anode layer has a conductivity of between 10 S/cm and 100 S/cm when measured at a temperature between 350° C. and 650° C.

In another embodiment, the disclosure provides a solid oxide fuel cell, wherein the anode layer has a conductivity of between 10 S/cm and 40 S/cm when measured at a temperature between 350° C. and 850° C.

In another embodiment, the disclosure provides a solid oxide fuel cell, wherein the anode layer has a conductivity of between 10 S/cm and 40 S/cm when measured at a temperature between 350° C. and 650° C.

In another embodiment, the disclosure provides a solid oxide fuel cell, wherein the anode layer has a conductivity of between 30 S/cm and 40 S/cm when measured at a temperature between 350° C. and 850° C.

In another embodiment, the disclosure provides a solid oxide fuel cell, wherein the anode layer has a conductivity of between 30 S/cm and 40 S/cm when measured at a temperature between 350° C. and 650° C.

In another embodiment, the disclosure provides a solid oxide fuel cell, further comprising a cathode functional layer disposed between the electrolyte layer and the cathode layer. In another embodiment, the cathode functional layer comprises LSCF, BSCF, SSCF, SSC, YSZ, SSZ, GDC, SDC, SNDC, ESB, DWSB, YSB, LSGM, or combinations thereof. In another embodiment, the cathode functional layer comprises GDC.

In another embodiment, the disclosure provides a solid oxide fuel cell, wherein the anode layer comprises only oxide materials.

In another embodiment, the disclosure provides a solid oxide fuel cell, wherein the anode layer is porous.

In another embodiment, the disclosure provides a solid oxide fuel cell, wherein the anode layer further comprises GDC.

In another embodiment, the disclosure provides a solid oxide fuel cell, wherein the anode layer further comprises cobalt doped GDC.

In another embodiment, the disclosure provides a solid oxide fuel cell, wherein the anode layer is infiltrated with Ni or Ni-GDC.

In another embodiment, the disclosure provides a solid oxide fuel cell, wherein the anode layer is infiltrated with a multivalent transition metal, e.g., Fe.

In another embodiment, the disclosure provides a solid oxide fuel cell, wherein the anode layer comprises $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$.

In another embodiment, the disclosure provides an oxide composition comprising:

$$SrM^1{}_xM^2{}_{((1-x)/2)}Mo_{((1-x)/2)}O_{3\pm\delta}$$

wherein $M^1$ and $M^2$ are different transition metals and are not Mo, x is about 0.1-0.5; and δ is about 0-1.5. In one embodiment, $M^1$ is Fe and $M^2$ is Co.

In another embodiment, the disclosure provides an oxide composition comprising:

$$SrM^1{}_xM^2{}_yMo_zO_3$$

wherein $M^1$ and $M^2$ are different transition metals and are not Mo, x is about 0.1-0.5; y is about 1−x; and z is about 1−x. In one embodiment, $M^1$ is Fe and $M^2$ is Co.

In another embodiment, the disclosure provides an oxide composition, wherein x is about 0.1-0.4. In another embodiment, x is about 0.1-0.3. In another embodiment, x is about 0.1-0.25.

In another embodiment, the disclosure provides an oxide composition comprising $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$.

In another embodiment, the disclosure provides an oxide composition, which comprises $SrFe_{0.2}Co_{0.4}Mo_{0.4}O_3$.

In another embodiment, the disclosure provides an oxide composition, which comprises $SrFe_{0.1}Co_{0.45}Mo_{0.45}O_3$.

In another embodiment, the disclosure provides a method of making the solid oxide fuel cell comprising: (a) fabricating the cathode layer, the electrolyte layer, and the anode layer; and (b) forming a complete cell with the fabricated layers in (a); wherein the temperature of any subsequent fabrication steps, and the operating temperature of the solid oxide fuel cell, is between 350° C. and 850° C.

In another embodiment, the disclosure provides a method of making a solid oxide fuel cell, wherein the temperature of any subsequent fabrication steps, and the operating temperature of the solid oxide fuel cell, is between 350° C. and 650° C.

In another embodiment, the disclosure provides a method of making a solid oxide fuel cell further comprising at least one additional layer fabricated with the cathode layer, the electrode layer, and the anode layer to form the complete cell; and wherein the temperature of any subsequent fabrication steps, and the operating temperature of the solid oxide fuel cell, is between 350° C. and 850° C.

In another embodiment, the disclosure provides a method of making a solid oxide fuel cell, wherein the temperature of any subsequent fabrication steps, and the operating temperature of the solid oxide fuel cell, is between 350° C. and 650° C.

In another embodiment, the disclosure provides a method of making a solid oxide fuel cell, wherein the at least one additional layer is a cathode functional layer.

In another embodiment, the disclosure provides a method of making a solid oxide fuel cell, wherein the anode layer comprises $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$.

In another embodiment, the disclosure provides a method of making a solid oxide fuel cell, wherein the anode layer comprises $SrFe_{0.2}Co_{0.4}Mo_{0.4}O_3$.

In another embodiment, the disclosure provides a method of making a solid oxide fuel cell, wherein the anode layer comprises $SrFe_{0.1}Co_{0.45}Mo_{0.45}O_3$.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention. The following drawings are given by way of illustration only, and thus are not intended to limit the scope of the present invention.

FIG. 2 shows a schematic of a solid oxide fuel cell (SOFC) comprising a 15-20 μm $Sr_{0.5}Sm_{0.5}CoO_3$-gadolinia doped ceria (SSC-GDC) cathode layer, a 5 μm 2 mol % cobalt doped GDC cathode functional layer, a 20-30 μm GDC electrolyte layer, and a glycine-nitrate process (GNP)

strontium iron cobalt molybdenum oxide-gadonlina doped ceria (SFCM-GDC) composite anode layer infiltrated with Ni-GDC (~10 wt % loading) according to one embodiment.

DETAILED DESCRIPTION

This specification discloses one or more embodiments that incorporate the features of this invention. The disclosed embodiment(s) merely exemplify the invention. The scope of the invention is not limited to the disclosed embodiment(s). Multiple inventions may be described. The invention is defined by the claims appended hereto.

The embodiment(s) described, and references in the specification to "one embodiment," "an embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, that feature, structure, or characteristic may be used in connection with features, structures, or characteristics of other embodiments whether or not explicitly described.

The term "about" as used herein includes the recited number ±10%. Thus, "about ten" means 9 to 11.

As used herein, "at %" means atomic percentage which is calculated based on the number of atoms using the following formula:

Atomic % (at %)=100*((number of atoms of 1 component)/(number of atoms of all components).

Atomic percentage can also be calculated based on the number of moles using the formula:

Atomic % (at %)=100*((number of moles of 1 component)/(number of moles of all components)).

As used herein, "electron percolation" means the transport of an electron through a material. In cases wherein an electron percolates through a single material, such as strontium iron cobalt molybdenum oxide, electron percolation means that there is a path for the electron through a layer using that material only. For example, if a composite material has a first material and a second material and electrons percolate through the first material, this means that electrons do not have to pass through the second material when moving through the composite.

As used herein, "operating temperature" means the operating temperature of the fuel cell during steady state operation. Preferably, the operating temperature of a fuel cell is the optimal operating temperature that results in the most efficient fuel cell operation based on the fuel cell's structure and materials used to form the fuel cell, i.e. the materials of the anode layer, electrolyte layer(s), cathode layer, etc.

As used herein, "reduction" or "reducing" means the process of removing oxygen from a material, such as an anode layer, at a reduction temperature and in the presence of a reducing atmosphere having a low oxygen partial pressure, such as an $H_2$ atmosphere, $H_2$ and nitrogen atmosphere, or another inter gas atmosphere.

The basic operation of a solid oxide fuel cell is described in U.S. Pat. No. 9,525,179. Air flows into the system through an air inlet. As the air flows past the cathode layer, oxygen atoms are reduced within the cathode layer to create oxygen ions ($O^{2-}$) which flow towards the electrolyte layer. The oxygen ions travel through the electrolyte layer and into the anode layer, and then react with hydrogen gas at the anode layer. The reaction between the oxygen ions and the hydrogen gas at the anode layer creates $H_2O$ and electrons (e_). These electrons flow from the anode layer into the electronic circuit and back into the cathode layer. The electronic circuit uses the flow of electrons to power a device and the cathode layer uses the electrons to reduce oxygen atoms and start the process all over again. The chemical reactions for the fuel cell system can be expressed as follows:

Anode Reaction: $2H_2 + 2O^{2-} \rightarrow 2H_2O + 4e^-$
Cathode Reaction: $O_2 + 4e^- \rightarrow 2O^{2-}$
Overall Cell Reaction: $2H_2 + O_2 \rightarrow 2H_2O$.

In some embodiments, the present invention provides an oxide composition of formula (I):

$$SrFe_xCo_{((1-x)/2)}Mo_{((1-x)/2)}O_{3\pm\delta} \qquad (I)$$

wherein:
x is about 0.1-0.5; and
δ is about 0-1.5.

The ratios between the metals are measured as atomic percentage (at %).

In some embodiments, x is about 0.1-0.5, about 0.1-0.4, about 0.1-0.3, about 0.1-0.2, about 0.2-0.5, about 0.2-0.4, about 0.2-0.3, about 0.3-0.5, about 0.3-0.4, or about 0.4-0.5. In some embodiments, x is about 0.2. In some embodiments, x is about 0.1.

The variable δ in the above compositions represents an oxygen deficiency and/or surplus in the composition. The value of δ is dependent on temperature and the oxidation state of iron, cobalt, and molybdenum in the composition. Additionally, the value of δ may vary depending on the partial pressure of oxygen in the atmosphere and within the anode itself. In some embodiments, δ is about 0-1.5, about 0-1, about 0-0.5, about 0.5-1.5, or about 1.0-1.5.

The measured atomic ratios for Sr, Fe, Co, Mo, and O may differ from the theoretical ratios.

In some embodiments, the present invention provides a solid oxide fuel cell (SOFM) comprising:

(a) a cathode layer;
(b) an electrolyte layer; and
(c) an anode layer comprising a strontium iron cobalt molybdenum (SFCM) oxide composition.

In some embodiments, the SOFC comprises a cathode layer. In some embodiments, the materials that can be used for the cathode layer include, but are not limited to, composite materials having (1) a material selected from the group consisting of lanthanum strontium cobalt iron oxide (LSCF), barium strontium cobalt iron oxide (BSCF), samarium strontium cobalt iron oxide (SSCF), samarium strontium cobalt oxide (SSC), and lanthanum strontium manganate (LSM); and (2) a material selected from the group consisting of: yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM). In some embodiments, the material used for the cathode layer comprises SSC-GDC.

In some embodiments, the cathode layer may be composed of a single material selected from the group consisting of lanthanum strontium cobalt iron oxide (LSCF), barium strontium cobalt iron oxide (BSCF), samarium strontium cobalt iron oxide (SSCF), lanthanum strontium manganate (LSM). In another embodiment, the cathode layer may comprise yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

In some embodiments, the SOFC comprises an electrolyte layer. In some embodiments, the materials that can used for the electrolyte layer include, but are not limited to, yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), yttria stabilized bismuth oxide (YSB), strontium and magnesium doped lanthanum gallate (LSGM), and combinations thereof. The electrolyte layer in some embodiments may also include multiple dopants and stabilizers. In some embodiments, the electrolyte layer comprises GDC.

In some embodiments, the SOFC comprises an anode layer. In some embodiments, the anode layer comprises an oxide composition. In some embodiments, the anode layer comprises various compositions of strontium iron cobalt molybdenum oxide (SFCM). SFCM compositions have been found to be compatible with intermediate- and low-temperature SOFCs and provide high conductivity, reduction-oxidation stability, and compatibility with hydrocarbon and sulfur-containing fuels. Furthermore, these materials avoid drawbacks associated with traditional Ni-based oxide anode materials.

SFCM materials have high electronic conductivity when reduced at low temperatures. Being able to reduce the anode layer at low temperatures reduces damage to other layers within the fuel cell that may be sensitive to temperature. Such temperature sensitive layers may include the electrolyte layer and/or the cathode layer. According to some embodiments, SFCM anode materials have high conductivity when reduced at a temperature that is similar to the operating temperature of the SOFC. If a material can be reduced at temperatures similar to the operating temperature of the SOFC, the anode layer can be reduced in situ, meaning that a separate reducing operation during the fabrication of the SOFC is unnecessary. In some embodiments, the anode material has a high conductivity when reduced at a temperature of less than 850° C. In some embodiments, the anode material has a high conductivity when reduced at a temperature of less than 650° C. In some embodiments, the anode material is reduced in situ.

In some embodiments, the crystal structure of the anode layer is perovskite. In some embodiments, the anode layer includes only oxide materials.

In some embodiments, the anode layer has a high conductivity at temperatures below 900° C., below 850° C., below 650° C., below 600° C., below 450° C., or below 400° C. In some embodiments, the anode layer has a high conductivity at temperatures between 350° C. and 900° C., 350° C. and 850° C., 350° C. and 650° C., 350° C. and 600° C., 350° C. and 450° C., 350° C. and 400° C., 400° C. and 900° C., 400° C. and 850° C., 400° C. and 650° C., 400° C. and 600° C., 400° C. and 450° C., 450° C. and 900° C., 450° C. and 650° C., 450° C. and 600° C., 600° C. and 900° C., 600° C. and 850° C., 600° C. and 650° C., 650° C. and 900° C., 650° C. and 850° C., or 850° C. and 950° C. In some embodiments, the anode layer has a high conductivity at temperatures below 650° C. In some embodiments, the anode layer has a high conductivity at temperatures below 600° C.

In some embodiments, the anode layer has a conductivity of at least 10 S/cm when measured at a temperature less than 850° C. In some embodiments, the anode layer has a conductivity of at least 10 S/cm when measured at a temperature less than 650° C. In some embodiments, the anode layer has a conductivity between 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 s/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature less than 850° C. In some embodiments, the anode layer has a conductivity between 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 s/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature less than 650° C.

In some embodiments, the anode layer has a conductivity between 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 s/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature of 850° C. In some embodiments, the anode layer has a conductivity between 10 S/cm and 100 S/cm, 10 S/cm and 50 S/cm, 10 S/cm and 40 S/cm, 10 S/cm and 35 S/cm, 10 S/cm and 30 S/cm, 30 S/cm and 100 S/cm, 30 s/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature of 650° C. In some embodiments, the anode layer has a conductivity between 10 S/cm and 100 S/cm, 10 S/cm and 50 S/cm, 10 S/cm and 40 S/cm, 10 S/cm and 35

S/cm, 10 S/cm and 30 S/cm, 30 S/cm and 100 S/cm, 30 s/cm and 50 S/cm, 30 S/cm and 40 S/cm, 30 S/cm and 35 S/cm, 35 S/cm and 100 S/cm, 35 S/cm and 50 S/cm, 35 S/cm and 40 S/cm, 40 S/cm and 100 S/cm, 40 S/cm and 50 S/cm, or 50 S/cm and 100 S/cm when measured at a temperature of 500° C.

In some embodiments, the anode layer comprises a SFCM of Formula 1. In some embodiments, the anode layer comprises a SFCM selected from the group consisting of $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, and $SrFe_{0.5}Co_{0.25}Mo_{0.25}O_3$. In some embodiments, the anode layer comprises $SrFe_{0.2}Co_{0.4}Mo_{0.4}O_3$. In some embodiments, the anode layer comprises $SrFe_{0.1}Co_{0.45}Mo_{0.45}O_3$.

FIGS. 2A and 2B show exemplary fuel cells according to the invention. As shown in FIG. 2A, in some embodiments, a fuel cell comprises a cathode layer, an electrolyte bilayer, and an anode. As shown in FIG. 2B, in some embodiments, a fuel cell comprises a cathode layer, a cathode functional layer, an electrolyte layer and an anode layer.

In some embodiments, the SOFC comprises a cathode functional layer. In some embodiments, the cathode functional layer improves the performance of the cathode layer. In some embodiments, the material that can be used for cathode functional layer disposed over the electrolyte layer include, but are not limited to, $La_{0.65}Sr_{0.5}Co_2O_5$ (LSM), $La_{0.6}Sr_{0.4}Co_{0.2}Fe_{0.8}O_{3-\delta}$, $La_{0.6}Sr_{0.4}Co_{0.2}Fe_{0.8}O_{3-\delta}$(LSCF), $La_{0.8}Sr_{0.2}Cu_{0.9}Fe_{0.1}O_{2.5}$ (LSCuF), $La_{0.7}Sr_{0.3}CoO_3$ (LSC), $Sm_{0.5}Sr_{0.5}CoO_3$ (SSC), $SmBa_{0.5}Sr_{0.5}Co_2O_5$ (SBSC), $GdSrCo_2O_5$ (GSC), $LaBaCo_2O_5$ (LBC), $YBaCo_2O_5$ (YBC), $Nd_{1.8}Ce_{0.2}CuO_4$ (NCC), $La_{0.8}Sr_{0.2}Co_{0.3}Mn_{0.1}Fe_{0.6}O_3$ (LSCFM), $La_{0.98}Ni_{0.6}Fe_{0.4}O_3$ (LNF), $La_{1.2}Sr_{0.8}NiO_4$ (LSN), $La_{0.7}Sr_{0.3}FeO_3$ (LSF), $La_2Ni_{0.6}Cu_{0.4}O_4$ (LNC), silver, and their composites. The above compounds are listed in their stoichiometric ratios, but as appreciated by one of ordinary skill in the art, the atomic ratios may vary slightly. Furthermore, while some of these compounds may require a high firing temperature, it is appreciated that modifiers may be used to lower the firing temperature of these materials for use in intermediate- and low-temperature solid-oxide fuel cells.

In some embodiments, the SOFC comprises an anode functional layer. An anode functional layer is a separate anode layer with finer particle sizes to increase specific surface area, thereby increasing the electrochemical reaction rate at the interface between anode layer and electrolyte layer. In some embodiments, the anode functional layer is less porous than the rest of the anode layer. This may be achieved by controlling particle distribution and/or particle/solvent/binder ratios. In some embodiments, the anode functional layer is made of the same material as the anode layer itself. In some embodiments, the anode layer is made of a material that is different from the anode layer itself, such as Ni-GDC, Ni-perovskite, or with similar materials where Ni in replaced with a different metal.

In some embodiments, the SOFC may also comprise structures for blocking the diffusion of mobile dopant materials, e.g. iron, cobalt, or molybdenum, out of SFCM, while maintaining the functionality of the SFCM as part of the SOFC. The diffusion of mobile dopant materials into an electrolyte layer can decrease the conductivity of the electrolyte layer and reduce the efficiency of the SOFC. Iron, cobalt, or molybdenum diffusions can also decrease the mechanical strength of the electrolyte layer and result in the formation of a phase or phases that cause high interfacial resistance between the anode layer and the electrolyte.

Fabrication of Solid Oxide Fuel Cells Using a SFCM Anode

In some embodiments, the present invention provides a method of making a solid oxide fuel cell comprising a cathode layer, an electrolyte layer, and an anode layer, wherein the anode layer comprises a strontium iron cobalt molybdenum composition comprising:

(a) fabricating the cathode layer, the electrolyte layer, and the anode layer; and (b) forming a complete cell with the fabricated layers in (a).

In some embodiments, the temperature of any subsequent fabrication steps, and the operating temperature of the solid oxide fuel cell, does not exceed 850° C. In some embodiments, the temperature of any subsequent fabrication steps, and the operating temperature of the solid oxide fuel cell, does not exceed 650° C. In some embodiments, the temperature of any subsequent steps, and the operating temperature of the solid oxide fuel cell, does not exceed 600° C.

In some embodiments, the present invention provides a method of making a solid oxide fuel cell comprising a cathode layer, a cathode functional layer, an electrolyte layer, and an anode layer, wherein the anode layer comprises a strontium iron cobalt molybdenum composition comprising:

(a) fabricating the cathode layer, the cathode functional layer, the electrolyte layer, and the anode layer; and (b) forming a complete cell with the fabricated layers in (a).

In some embodiments, the temperature of any subsequent fabrication steps, and the operating temperature of the solid oxide fuel cell, does not exceed 850° C. In some embodiments, the temperature of any subsequent fabrication steps, and the operating temperature of the solid oxide fuel cell, does not exceed 650° C. In some embodiments, the temperature of any subsequent steps, and the operating temperature of the solid oxide fuel cell, does not exceed 600° C.

Figure 7:
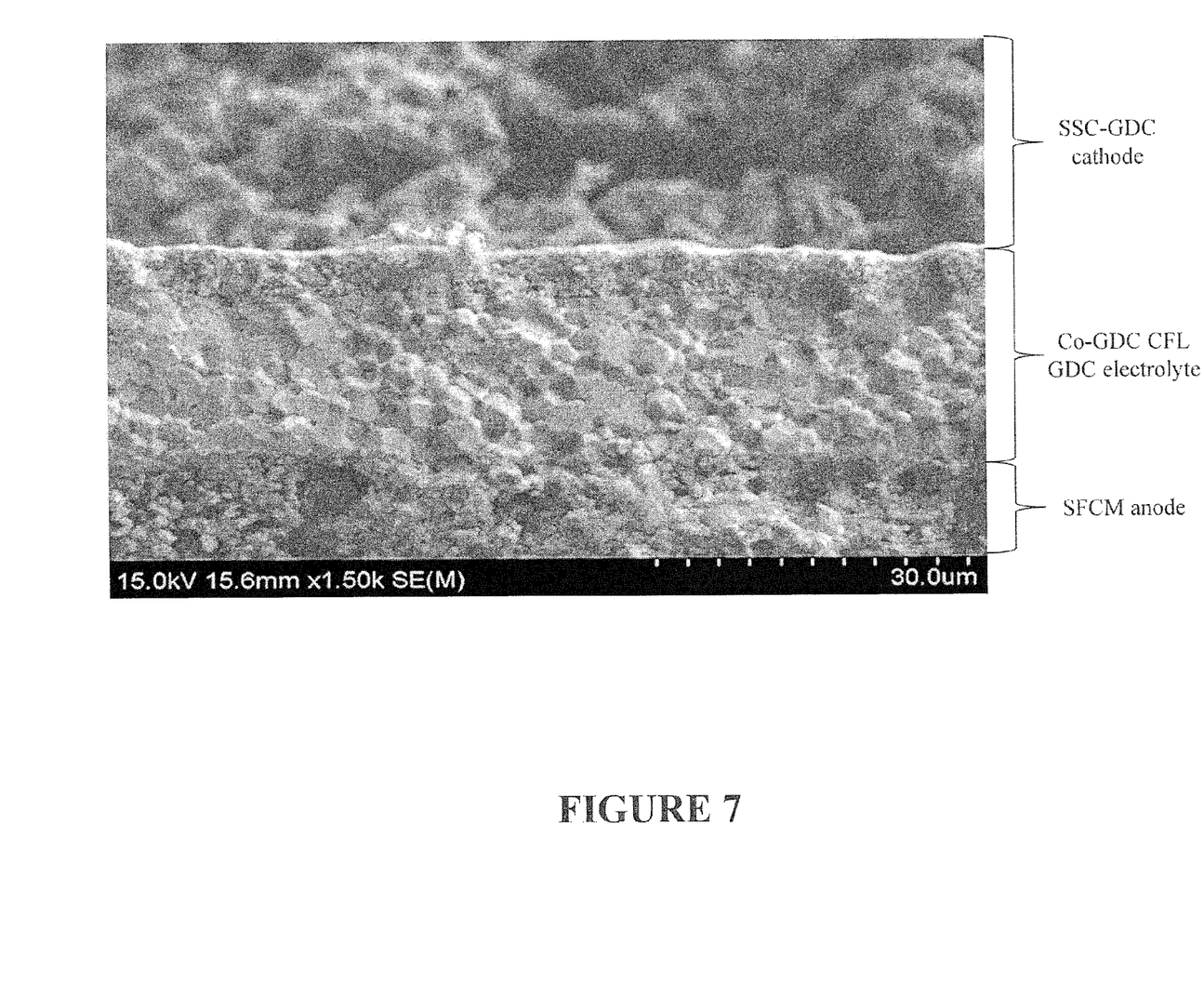
FIG. 7 shows a cross sectional scanning electron microscope (SEM) image of a complete fuel cell comprising a SSC-GDC cathode layer, a Co-GDC cathode functional layer, a GDC electrolyte layer, and a SFCM #3 anode layer according to one embodiment.

In some embodiments, the electronic conducting SFCM anode material was combined with pyrolyzable pore formers to facilitate adequate fuel diffusion through the ceramic anode after firing. A cross sectional scanning electron microscope (SEM) image of a complete solid oxide electrolyte fuel cell (SOFC) prepared with a SFCM anode material that was combined with pyrolyzable pore formers is shown in FIG. 7.

While the method of Example 1 describes fabricating four layers (anode, electrolyte, cathode functional layer, and cathode), it is appreciated that the completed fuel cell may include any number of additional layers. For example, but not limited thereto, the completed fuel cell may include a metallic contact layer and/or an electrolyte layer having two layers (i.e. electrolyte bilayer).

In some embodiments, the SFCM is reduced before fabrication of the anode layer. It is preferable that the reduction temperature for the anode layer be keep as low as possible within the ranges described above, while still achieving sufficient oxygen removal and conductivity. Low reduction temperature is preferred because other layers in the fuel cell may be susceptible to temperature, thus resulting in, for example, atomic diffusion, annealing, and/or phase changes within or between the other layers. A high reducing temperature that alters this microstructure may be detrimental to the conductivity of the anode layer and the operating efficiency of the fuel cell. In some embodiments, the SFCM is not reduced before fabrication of the anode layer.

In some embodiments, the anode layer of the completed fuel cell is not reduced in in the completed fuel cell, but is reduced in situ instead. In other words, the anode layer is reduced during fuel cell operation. Since the anode layer is capable of being reduced at a temperature no higher than the processing temperature, in situ reduction of the anode layer is possible. In situ reduction of the anode layer of the completed fuel cell decreases processing costs.

In addition to reducing the anode layer, additional processing steps may be performed on the completed fuel cell. In some embodiments, additional processing steps are not performed at temperatures that exceed 850° C. In some embodiments, additional processing steps are not performed at temperatures that exceed 650° C. In some embodiments, additional processing steps are not performed at temperatures that exceed 600° C. Additional processing temperatures may be performed at any appropriate temperature, including temperatures as low as 0° C.

In some embodiments, the operating temperature of the SOFC does not exceed 850° C. In some embodiments, the operating temperature of the SOFC does not exceed 650° C. In some embodiments, the operating temperature of the SOFC is at least 350° C. to ensure efficient performance of the SOFC. In some embodiments, the operating temperature of the SOFC is between 350° C. and 850° C., 350° C. and 650° C., 350° C. and 550° C., 350° C. and 450° C., 450° C. and 850° C., 450° C. and 650° C., 450° C. and 550° C., 550° C. and 850° C., 550° C. and 650° C., or 650° C. and 850° C. In some embodiments, the operating temperature of the SOFC is between 450° C. and 650° C.

Power density is the amount of power (time rate of energy transfer) per unit volume. In some embodiments, the power density of the SOFC is high. In some embodiments, the high peak power density of the SOFC is between 300 mW/cm$^2$ and 800 mW/cm$^2$, 300 mW/cm$^2$ and 600 mW/cm$^2$, 300 mW/cm$^2$ and 500 mW/cm$^2$, 500 mW/cm$^2$ and 800 mW/cm$^2$, 500 mW/cm$^2$ and 600 mW/cm$^2$, or 600 mW/cm$^2$ and 800 mW/cm$^2$ when measured at 450° C. In some embodiments, the high peak power density of the SOFC is between 300 mW/cm$^2$ and 800 mW/cm$^2$, 300 mW/cm$^2$ and 600 mW/cm$^2$, 300 mW/cm$^2$ and 500 mW/cm$^2$, 500 mW/cm$^2$ and 800 mW/cm$^2$, 500 mW/cm$^2$ and 600 mW/cm$^2$, or 600 mW/cm$^2$ and 800 mW/cm$^2$ when measured at 500° C. In some embodiments, the high peak power density of the SOFC is between 300 mW/cm$^2$ and 800 mW/cm$^2$, 300 mW/cm$^2$ and 600 mW/cm$^2$, 300 mW/cm$^2$ and 500 mW/cm$^2$, 500 mW/cm$^2$ and 800 mW/cm$^2$, 500 mW/cm$^2$ and 600 mW/cm$^2$, or 600 mW/cm$^2$ and 800 mW/cm$^2$ when measured at 650° C.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

EXAMPLES

The following examples are illustrative and non-limiting, of the products and methods described herein. Suitable modifications and adaptations of the variety of conditions, formulations, and other parameters normally encountered in the field and which are obvious to those skilled in the art in view of this disclosure are within the spirit and scope of the invention.

Example 1

Compositions of $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, and $SrFe_{0.5}Co_{0.25}Mo_{0.25}O_3$ having Co to Mo in the ratio of 1:1 were synthesized using the glycine-nitrate combustion method modified using citric acid. Stoichiometric amounts of strontium nitrate (Alfa Aesar 99.0%), iron nitrate nonahydrate (Sigma Aldrich 99.95%), cobalt nitrate hexahydrate (Alfa Aesar 98%-102%) and ammonium molybdate (para) tetrahydrate (Alfa Aesar 99%) were dissolved in de-ionized water separately. Glycine (glycine to nitrate in the ratio of 1:1) was dissolved in de-ionized water and subsequently, citric acid (with 20% glycine by weight) was added to maintain a pH of approximately 2. The strontium salt solutions were poured into the glycine-citrate mixture and heated on a hot plate to evaporate solvent and to form a viscous gel. The temperature of the hot plate was increased to 350° C., wherein auto ignition occurred. At this higher temperature, the metal nitrates decompose to metal oxides and oxides of nitrogen (see, e.g., Singh, K., et al., *Indian J. Eng. Mater. Sci.* 13:525-530 (2006)).

The residues of the reaction were ground and calcined at 1100° C. for 4 hours to obtain powders. The SFCM anode supported SOFCs were fabricated by tape-casting technique. The tape casting technique is a well-known colloidal shaping technique for large-area, thin, flat ceramic sheets or membranes (see, e.g., J. A. Lewis, *J. Am. Chem. Soc.* 83:2341-2359 (2000)). The anode scaffold was prepared by mixing $SrFe_{0.2}Co_{0.4}Mo_{0.4}O_3$ (SFCM #3) and 2% cobalt doped GDC (in a weight ratio of 2:1). Poly(methyl methacrylate) (Soken Chemical & Engineering Co., Ltd, Tokyo, Japan), used as a pore former, was added to obtain an initial porosity of 40 vol %. Polyvinyl butyral, butyl benzyl phthalate, and fish oil were used as binder, plasticizer, and dispersant, respectively. For SFCM tape-casting recipe, ethanol was used as solvent. Prepared raw tapes (i.e. before firing) and 25-30 μm raw GDC electrolyte tape were laminated together and co-fired at 1200° C. for 4 hours.

Figure 1A:
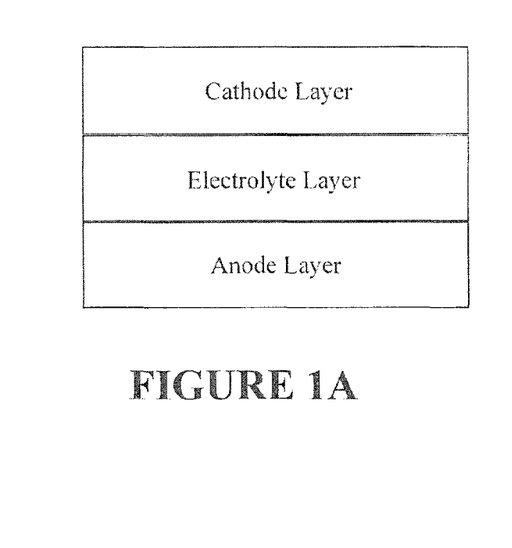
FIG. 1A shows a fuel cell comprising a cathode, an electrolyte layer, and an anode according to one embodiment.
Figure 1B:
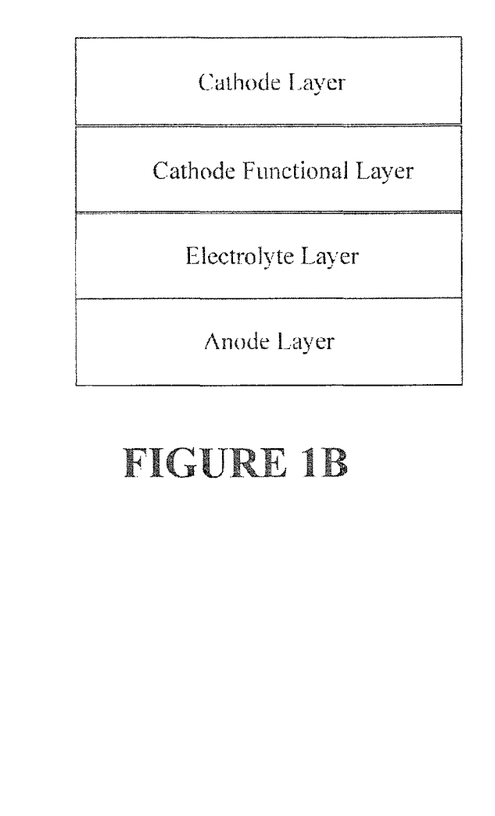
FIG. 1B shows a fuel cell comprising a cathode, a cathode functional layer, an electrolyte layer, and an anode layer according to one embodiment.
Figure 2:
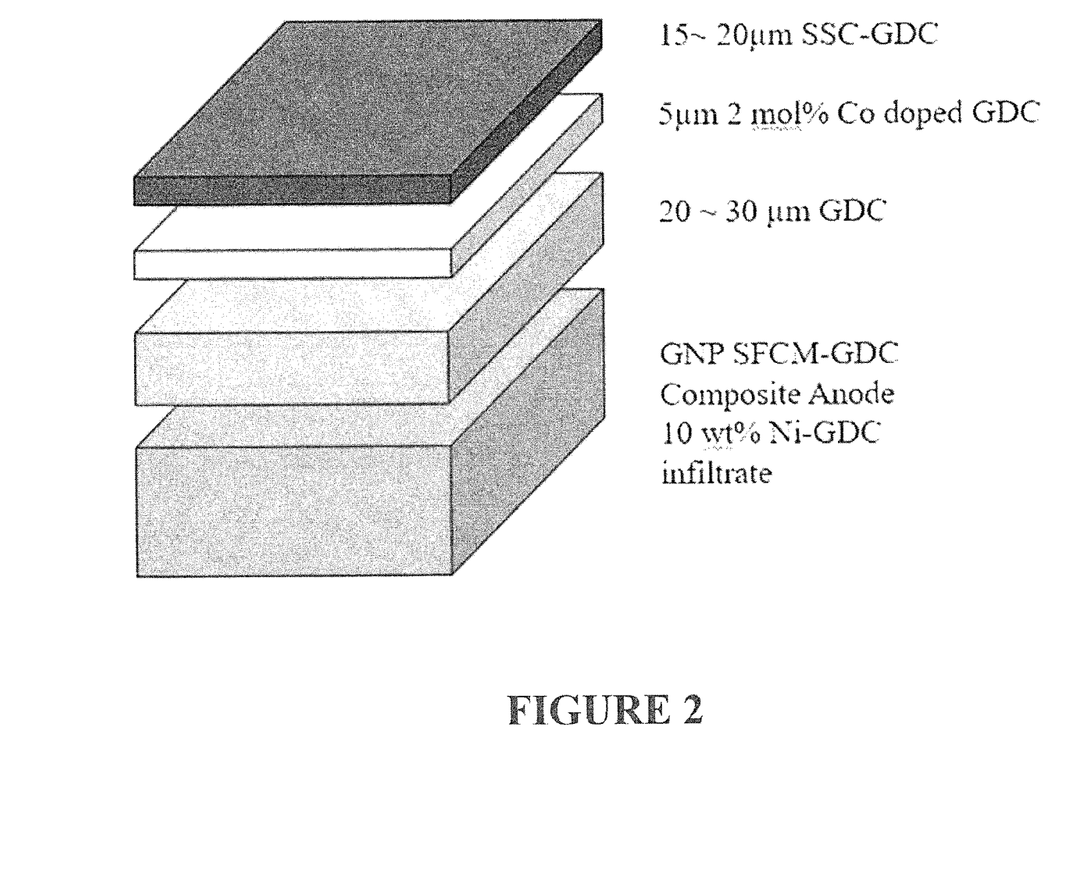
Figure 3:
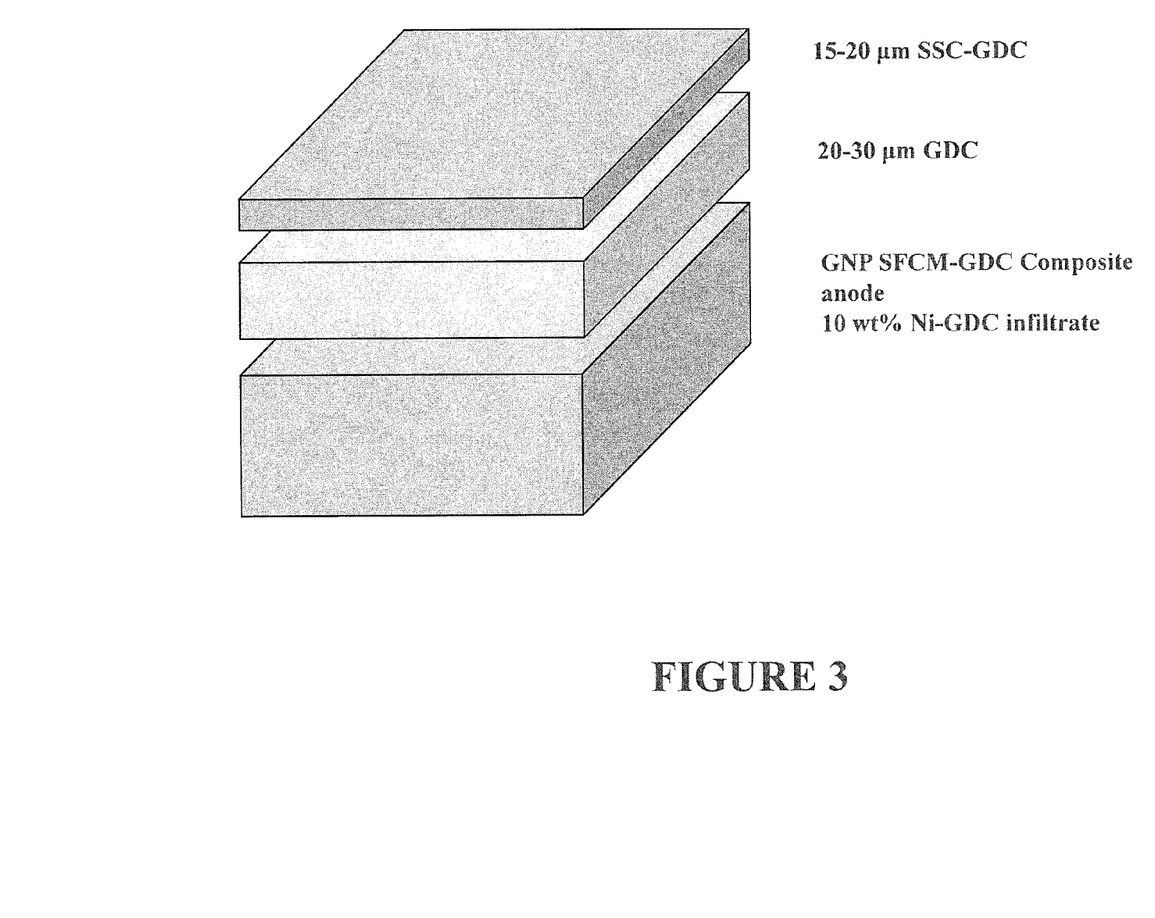
FIG. 3 shows a schematic of a SOFC comprising a 15-20 μm SSC-GDC layer, a 20-30 μm GDC layer, and a GNP SFCM-GDC composite anode layer infiltrated with Ni-GDC (~10 wt % loading) according to one embodiment.

The electrolyte surface of the half-cell was deposited with a 5-7 μm Co-doped GDC as cathode functional layer (CFL) initially. The CFL was prepared by ball milling GDC powder and 2 mol % cobalt nitrates in ethanol overnight. Subsequently, ethanol was evaporated and heat treated at 400° C. for 1 hour. The mixed powder was made into a paste and brush painted on the half-cell. The half-cell was dried in an oven at 70° C. for 1 hour. Subsequently, $Sr_{0.5}Sm_{0.5}CoO_{3-\delta}$-GDC (SSC-GDC) cathode was applied and the assembly was co-fired at 950° C. for 2 hours. Ag metal was used as the current collector at both electrodes. The schematic of the SFCM based anode supported cell is shown in FIG. 2. An optimized quantity of Ni-GDC (loading of approximately 10 wt %) was infiltrated into the anode. A 400° C. burnout process was performed during each infiltration interval and a final heat treatment was performed at 800° C. for 1 hour.

Figure 4:
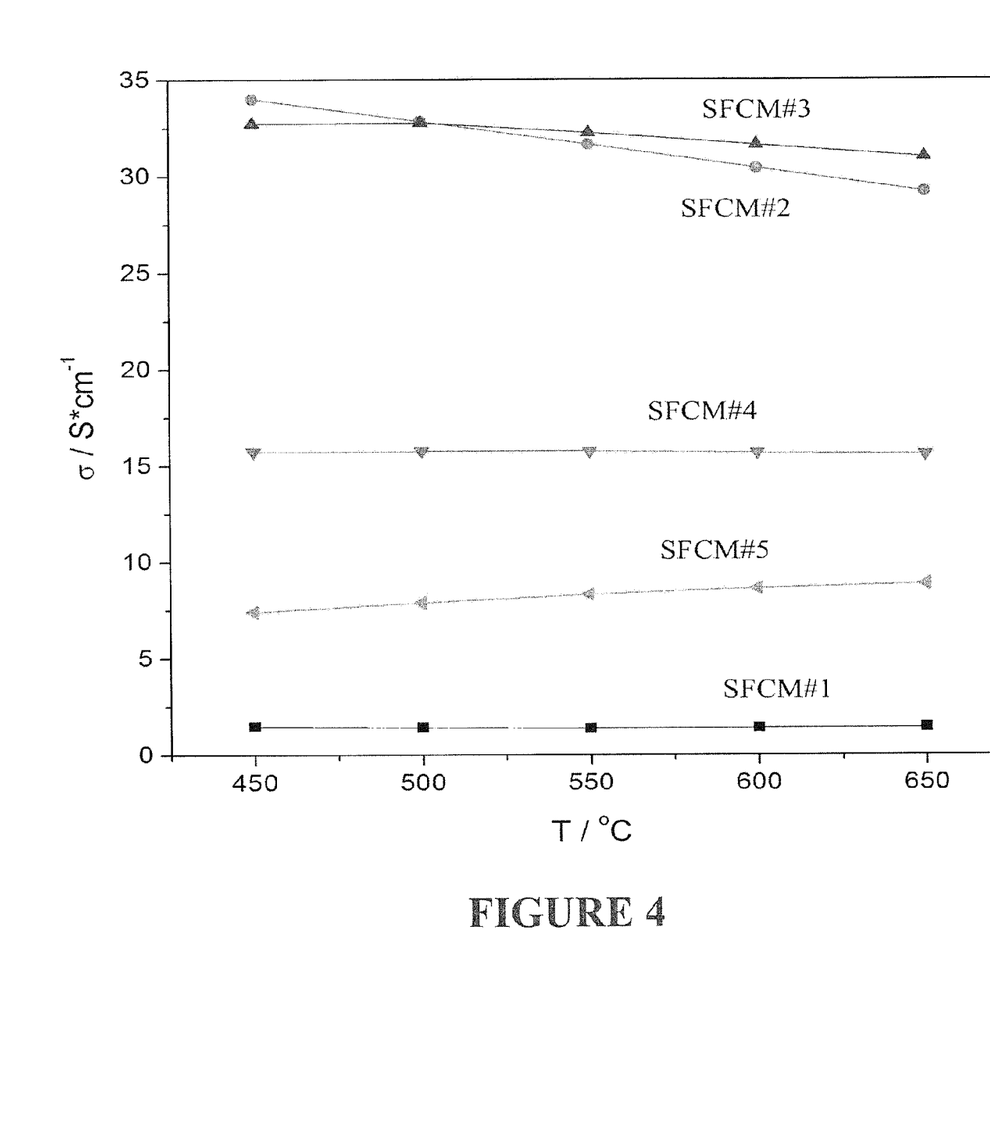
FIG. 4 shows a graph comparing the conductivities of various anode materials ($SrCo_{0.5}Mo_{0.5}O_3$ (SFCM #1), $SrFe_{0.1}Co_{0.45}Mo_{0.45}O_3$ (SFCM #2), $SrFe_{0.2}Co_{0.4}Mo_{0.4}O_3$ (SFCM #3), $SrFe_{0.34}Co_{0.33}Mo_{0.33}O_3$ (SFCM #4), and $SrFe_{0.5}Co_{0.25}Mo_{0.25}O_3$ (SFCM #5)) reduced in 10% $H_2$/90% $N_2$ for about 24 hours.
Figure 5:
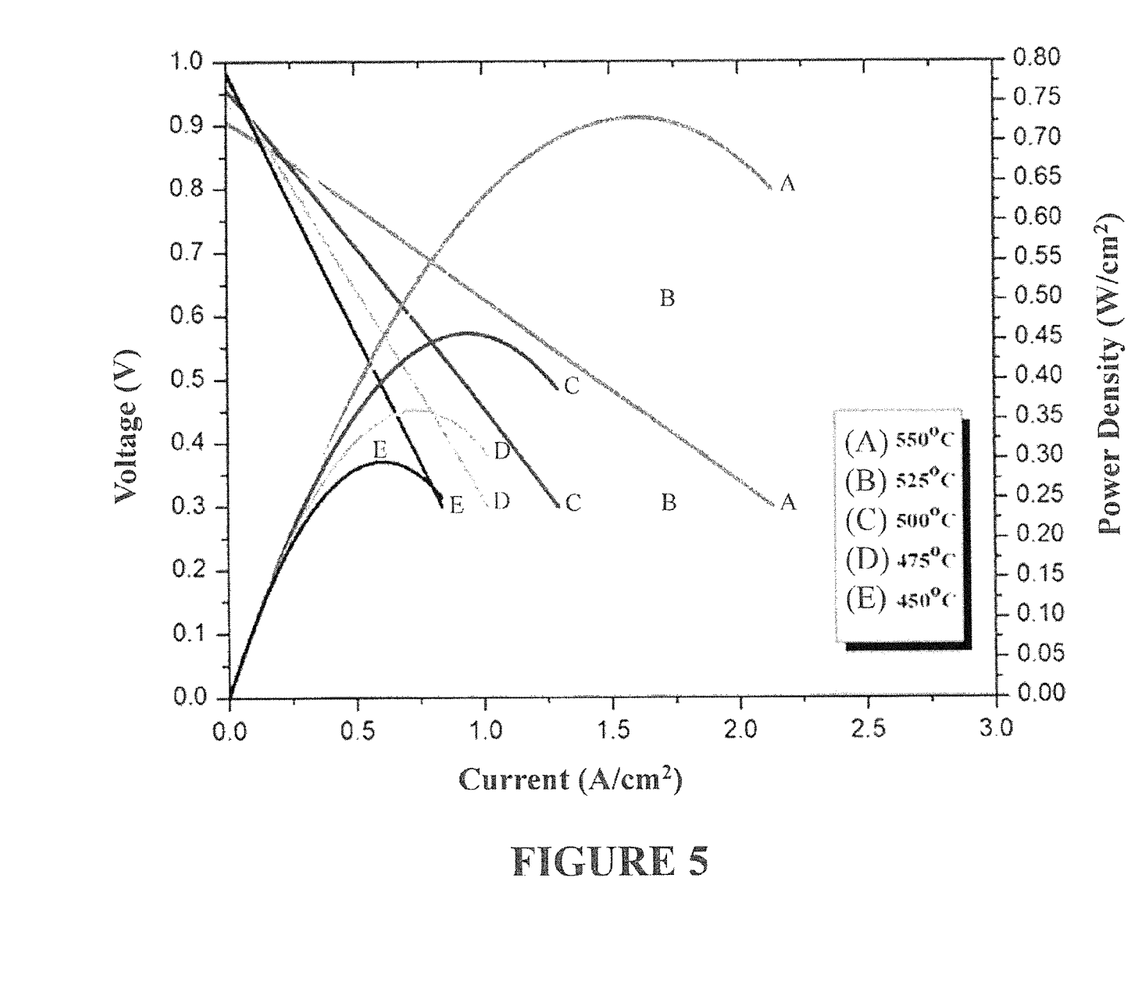
FIG. 5 is a plot of open circuit voltage (left scale) and power density (right scale) for a complete SOFC constructed with $SrFe_{0.2}Co_{0.4}Mo_{0.4}O_3$ (SFCM #3) composite anode, according to an embodiment of the invention, at various temperatures.

Typically ceramic anode based SOFCs require high operating temperature either because the conductivity is too low at low temperatures or the catalytic activity is not sufficient. As shown in FIG. 4, $SrFe_{0.2}Co_{0.4}Mo_{0.4}O_3$ (SFCM #3) and $SrFe_{0.1}Co_{0.45}Mo_{0.45}O_3$ (SFCM #2) based anode-supported cell was shown to have high electronic conductivity (30 S/cm measured at 650° C.) and has shown high performance at low temperatures—better than conventional Ni-GDC cermet supported cells. A high peak Power Density (PD) of 460 mW/cm² at 500° C. and 300 mW/cm² at 450° C. with current density of 1.0 A/cm² and 0.6 A/cm², respectively have been achieved with an SOFC having an anode layer comprising $SrFe_{0.2}Co_{0.4}Mo_{0.4}O_3$ as shown in FIG. 5.

Figure 6:
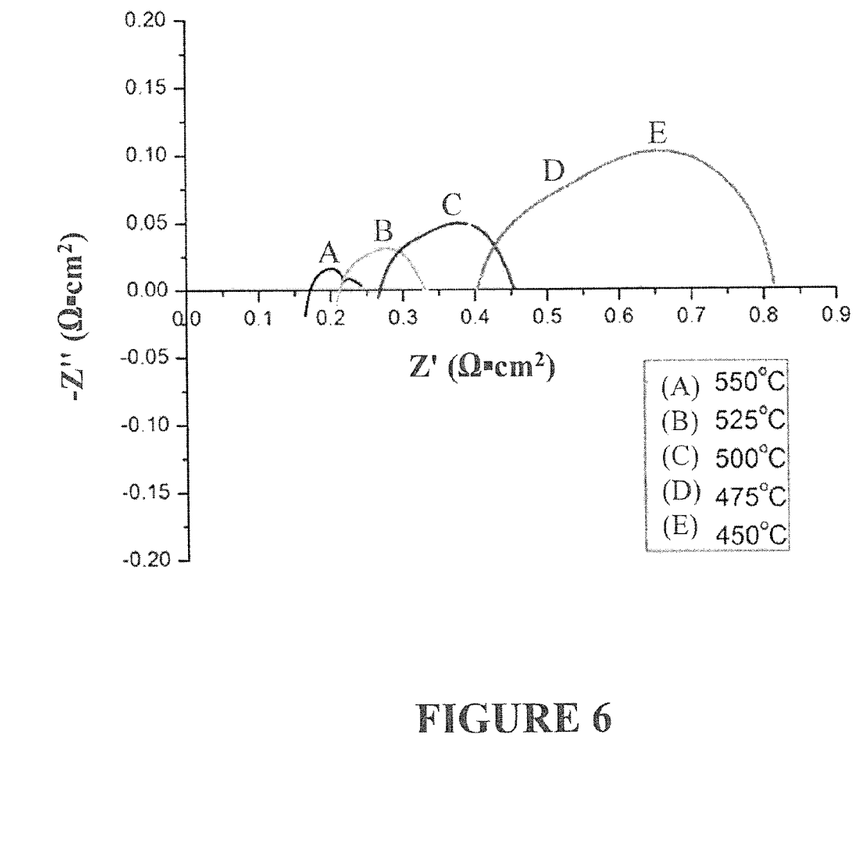
FIG. 6 shows Nyquist plots of a complete SOFC constructed with SFCM #3 composite anode, according to an embodiment of the invention, at various temperatures.
Figure 8:
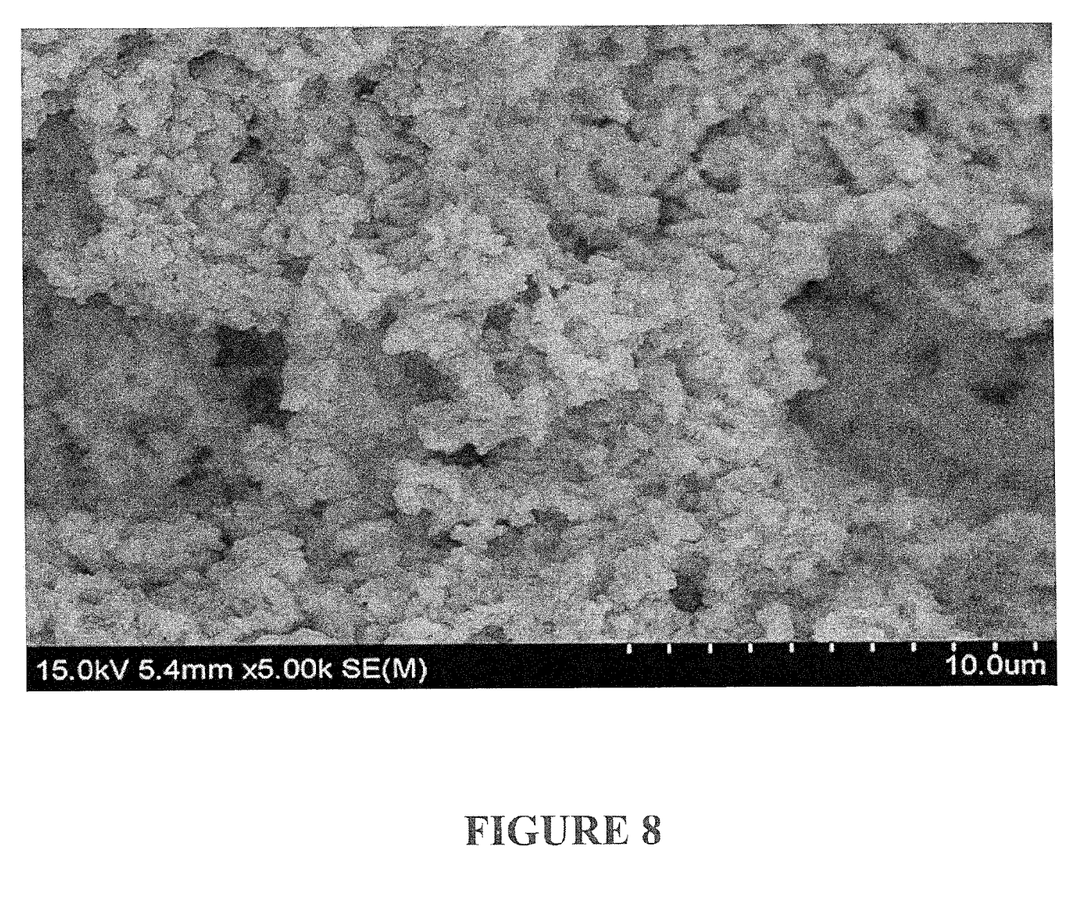
FIG. 8 shows a cross sectional SEM image of an SFCM #3 anode according to one embodiment.
Figure 9:
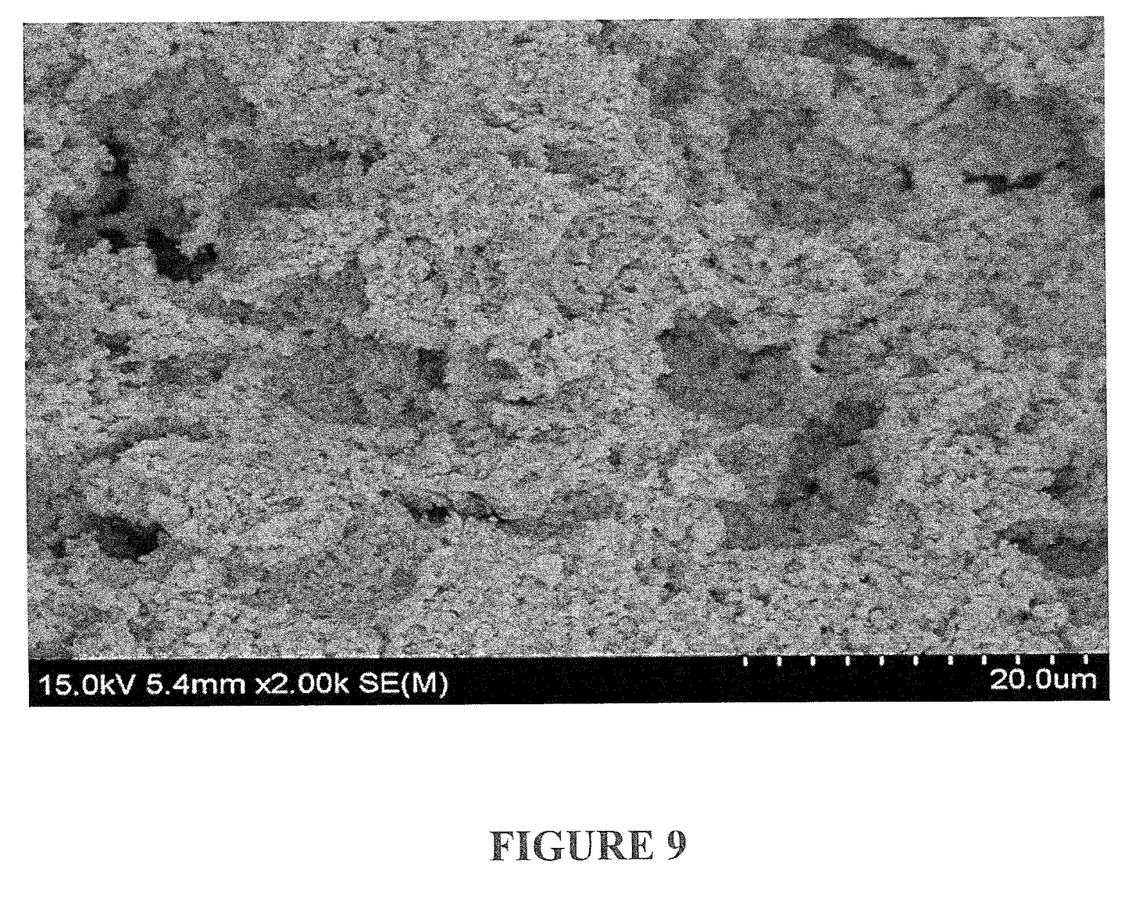
FIG. 9 shows a cross sectional SEM image of an SFCM #3 anode according to one embodiment.
Figure 10:
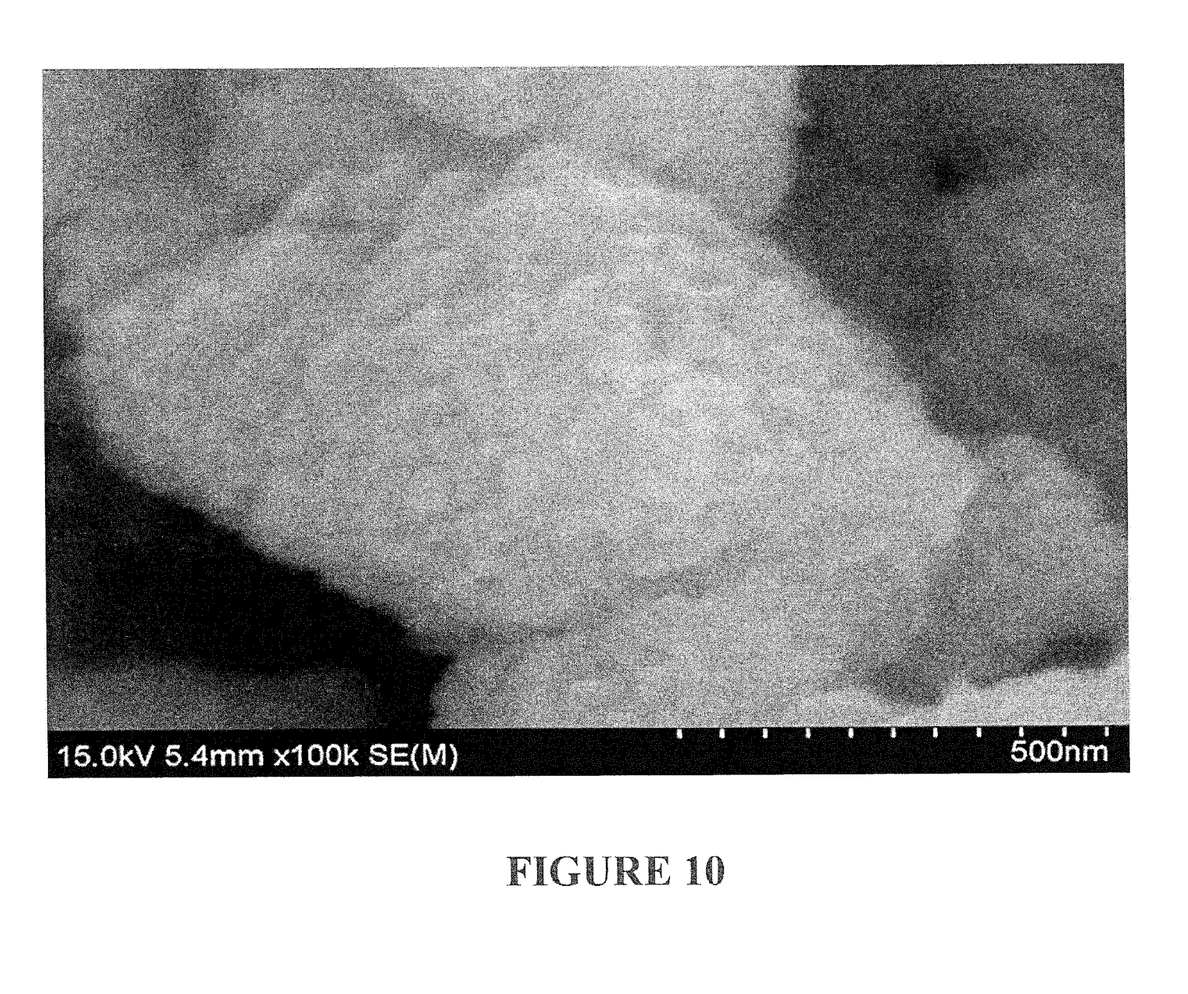
FIG. 10 shows a cross sectional SEM image of a SFCM #3 anode infiltrated with Ni-GDC anode according to one embodiment.

Shown in FIG. 6 are Nyquist plots of the electrochemical impedance measurements of an SOFC having an anode layer comprising $SrFe_{0.2}Co_{0.4}Mo_{0.4}O_3$. A CFL was incorporated at the interface of electrolyte and cathode to improve the cathode performance. $SrFe_{0.2}Co_{0.4}Mo_{0.4}O_3$ by itself is not a catalytically active material for hydrogen oxidation at low temperatures. Thus, Ni-GDC was infiltrated into the SFCM scaffold and the low temperature heat treatment process retained the nanomorphology. The SEM micrographs of the post-tested $SrFe_{0.2}Co_{0.4}Mo_{0.4}O_3$ anode support cell are shown in FIGS. 7-10. Shown in FIG. 7 is the cross-sectional SEM image showing the porous SFCM/GDC electrolyte/CFL/cathode. Shown in FIGS. 8-10 are cross-sectional SEM images showing the SFCM microstructure with Ni-GDC nano-particles deposited on the surface.

Having now fully described this invention, it will be understood by those of ordinary skill in the art that the same can be performed within a wide and equivalent range of conditions, formulations and other parameters without affecting the scope of the invention or any embodiment thereof. All patents, patent applications, and publications cited herein are fully incorporated by reference herein in their entirety.

What is claimed is:

1. A solid-oxide fuel cell comprising:
a cathode layer;
an electrolyte layer; and
an anode layer, the anode layer comprising a strontium iron cobalt molybdenum (SFCM) oxide material.

2. The solid oxide fuel cell of claim 1, wherein the SFCM oxide material has the formula:

$$SrM^1{}_xM^2{}_{((1-x)/2)}Mo_{((1-x)/2)}O_{3\pm\delta}$$

wherein:
M¹ is a transition metal;
M² is a transition metal;
wherein M¹ does not equal M², and neither M¹ nor M² is Mo;
x is about 0.1-0.5; and
δ is about 0-1.5.

3. The solid oxide fuel cell of claim 1, wherein the cathode layer comprises a composite comprising:
(a) a material selected from the group consisting of lanthanum strontium cobalt iron oxide (LSCF), barium strontium cobalt iron oxide (BSCF), samarium strontium cobalt iron oxide (SSCF), samarium strontium cobalt oxide (SSC), and lanthanum strontium manganate (LSM); and
(b) a material selected from the group consisting of yttria stabilized zirconia (YSZ), scandia stabilized zirconia (SSZ), gadolinia doped ceria (GDC), samaria doped ceria (SDC), samaria-neodymium doped ceria (SNDC), erbia stabilized bismuth oxide (ESB), dysprosium tungsten stabilized bismuth oxide (DWSB), yttria stabilized bismuth oxide (YSB), and strontium and magnesium doped lanthanum gallate (LSGM).

4. The solid oxide fuel cell of any claim 1, wherein the cathode layer comprises a composite comprising SSC and GDC.

5. The solid oxide fuel cell of claim 1, wherein the electrolyte layer comprises a material selected from the group consisting of YSZ, SSZ, GDC, SDC, SNDC, ESB, DWSB, YSB, and LSGM.

6. The solid oxide fuel cell of claim 1, wherein the electrolyte layer comprises GDC.

7. The solid oxide fuel cell of claim 1, wherein the anode layer has a conductivity of between 10 S/cm and 100 S/cm when measured at a temperature between 350° C. and 850° C.

8. The solid oxide fuel cell of claim 1, further comprising a cathode functional layer disposed between the electrolyte layer and the cathode layer, wherein the cathode functional layer comprises LSCF, BSCF, SSCF, SSC, YSZ, SSZ, GDC, SDC, SNDC, ESB, DWSB, YSB, LSGM, or combinations thereof.

9. The solid oxide fuel cell of claim 8, wherein the cathode functional layer comprises GDC.

10. The solid oxide fuel cell of claim 1, wherein the anode layer further comprises cobalt doped GDC.

11. The solid oxide fuel cell of claim 10, wherein the anode layer is infiltrated with a multivalent transition metal, wherein the multivalent transition metal is Ni or Ni-GDC.

12. The solid oxide fuel cell of claim 1, wherein the anode layer comprises $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$.

13. A method of making the solid oxide fuel cell of claim 1:
(a) fabricating the cathode layer, the electrolyte layer, and the anode layer; and
(b) forming a complete cell with the fabricated layers in (a);
wherein the temperature of any subsequent fabrication steps, and the operating temperature of the solid oxide fuel cell, is between 350° C. and 850° C.

14. The method of claim 13, further comprising at least one additional layer fabricated with the cathode layer, the electrode layer, and the anode layer to form the complete cell; and wherein the temperature of any subsequent fabrication steps, and the operating temperature of the solid oxide fuel cell, is between 350° C. and 850° C.

15. The method of claim 13, wherein the anode layer comprises $SrFe_{0.1}Co_{0.45}Mo_{0.45}O_3$, $SrFe_{0.2}Co_{0.4}Mo_{0.4}O_3$, $SrFe_{0.34}Co_{0.33}Mo_{0.33}O_3$, or $SrFe_{0.5}Co_{0.25}Mo_{0.25}O_3$.

16. The solid oxide fuel cell of claim 1, wherein the SFCM oxide material has the formula:

$$SrM^1{}_xM^2{}_yMo_zO_3$$

wherein:
M¹ is a transition metal;
M² is a transition metal;
wherein M¹ does not equal M², and neither M¹ nor M² is Mo;
x is about 0.1-0.5;
y is about 1-x; and
z is about 1-x.

17. The solid oxide fuel cell of claim 2, wherein x is about 0.1-0.25.

18. The solid oxide fuel cell of claim 1, wherein the anode layer comprises only oxide materials.

19. The solid oxide fuel cell of claim 1, wherein the anode layer is porous.

20. The solid oxide fuel cell of claim 1, wherein M¹ is Fe and M² is Co.

* * * * *